US012705157B1

(12) United States Patent
Raz

(10) Patent No.: US 12,705,157 B1
(45) Date of Patent: Aug. 11, 2026

(54) NON-INTRUSIVE PROCESSOR INSTRUMENTATION

(71) Applicant: Next Silicon Ltd, Givatayim (IL)

(72) Inventor: Elad Raz, Ramat Gan (IL)

(73) Assignee: Next Silicon Ltd, Givatayim (IL)

( * ) Notice: Subject to any disclaimer, the term of this patent is extended or adjusted under 35 U.S.C. 154(b) by 0 days.

(21) Appl. No.: 19/313,901

(22) Filed: Aug. 29, 2025

(51) Int. Cl.
*G06F 11/30* (2006.01)
*G06F 8/41* (2018.01)
*G06F 11/34* (2006.01)

(52) U.S. Cl.
CPC .......... *G06F 11/3419* (2013.01); *G06F 8/443* (2013.01); *G06F 11/3476* (2013.01)

(58) Field of Classification Search
CPC .................................................. G06F 11/3419
See application file for complete search history.

(56) References Cited

U.S. PATENT DOCUMENTS 8,229,723 B2 * 7/2012 Srinivasan .............. G06F 30/33 717/104
2017/0004063 A1 * 1/2017 Broderick ........... G06F 11/3495
2023/0195542 A1 * 6/2023 Purushotham ...... G06F 11/3466 719/318

* cited by examiner

*Primary Examiner* — Phuong Huynh

(57) ABSTRACT

A system for non-intrusive processor instrumentation, comprising: one or more hardware processors configured to execute a software program, wherein at least one hardware processor of the one or more hardware processors comprises sampler circuitry configured to sample a plurality of processor internal values, where each processor internal value is a value of one of a plurality of processor state elements, without interrupting execution of the software program; and at least one collector circuitry coupled to the sampler circuitry, configured to receive the plurality of processor internal values from the sampler circuitry and process the plurality of processor internal values while the one or more hardware processors continue normal operation.

21 Claims, 6 Drawing Sheets

400

NON-INTRUSIVE PROCESSOR INSTRUMENTATION

BACKGROUND

Some embodiments described in the present disclosure relate to a computerized system executing a software program and, more specifically, but not exclusively, to sampling values of processor state elements while executing the software program.

The field of processor instrumentation encompasses techniques and systems for monitoring, analyzing, and optimizing the performance of computer processors during program execution. As used herein, the term "processor instrumentation" refers to any method or system that collects data about processor operation, including but not limited to register values, internal state information, execution patterns, and performance metrics.

Traditional processor instrumentation techniques rely primarily on software-based approaches that require modification of the executing program or insertion of additional instructions to capture processor state information. Such software instrumentation methods typically operate by inserting monitoring instructions directly into the program code or by periodically interrupting program execution to read processor registers. As used herein, the term "software instrumentation" refers to any technique that uses software instructions to collect processor performance data during program execution. These approaches fundamentally alter the execution characteristics of the monitored program because the instrumentation process is synchronous with program execution; optionally, the instrumentation instructions compete for the same execution resources as the original program instructions, thereby creating pipeline stalls and reducing overall performance.

Furthermore, existing software instrumentation techniques suffer from significant limitations in terms of data accessibility. As used herein, the term "register file" refers to the collection of general-purpose and special-purpose registers that are architecturally visible and directly accessible to software instructions. Traditional instrumentation can only access values stored in the register file, which represents merely a subset of the processor's complete internal state. As used herein, the term "processor state elements" refers to all storage locations within a processor that maintain state information during operation, including but not limited to architectural registers, microarchitectural registers, pipeline registers, cache state storage, branch prediction tables, and any other storage elements that contain information about the processor's operational state. For brevity, henceforth the term "processor state elements" is used to mean both register file elements and internal processor state elements, and the terms are used interchangeably unless otherwise noted.

A typical register file that is accessible to software instrumentation provides access to general purpose registers such as data registers, address registers and working registers for arithmetic and logical operations, some special purpose architectural registers such as a program counter, a stack pointer and some status registers, and some specialized computation registers such as floating point unit registers. However, many critical processor state elements remain inaccessible to software instrumentation techniques. Some examples of inaccessible processor state elements include, but are not limited to, branch prediction unit registers, cache coherency state registers, pipeline control registers, and prefetch buffer contents. As used herein, the term "internal processor state elements" refers to processor state elements that are not part of the register file and are not directly accessible via software instructions. These internal processor state elements contain valuable performance and behavioral information that could significantly enhance program optimization efforts if accessible.

The synchronous nature of traditional instrumentation creates additional complications for accurate performance analysis. The act of collecting instrumentation data by inserting instructions into the software program, and additionally or alternatively interrupting execution of the software program, necessarily modifies the runtime environment of the system being measured, introducing measurement artifacts that can mask or distort the actual performance characteristics of the unmodified program. This phenomenon, commonly known as the "observer effect" in measurement systems, renders traditional software instrumentation inadequate for scenarios requiring high-fidelity performance data collection.

Some modern processors include hardware performance monitoring units (PMUs) that provide some hardware-assisted instrumentation capabilities through performance counters that can monitor predetermined events such as cache misses and branch mispredictions. However, these existing hardware-assisted instrumentation solutions suffer from fundamental architectural limitations. Current PMUs provide access only to a limited number of performance counters with predetermined functionality and cannot provide comprehensive access to internal processor state elements such as the complete contents of branch prediction unit registers, cache coherency state information, and other microarchitectural state data. Additionally, existing PMU-based solutions require software running on the monitored processor itself to read the performance counters and process the collected data, thereby consuming execution resources and potentially affecting program execution characteristics.

SUMMARY

Some embodiments described in the present disclosure relate to a computerized system executing a software program and, more specifically, but not exclusively, to sampling values of processor state elements while executing the software program.

It is an object of some embodiments of the present disclosure to provide a system and method for non-intrusive processor instrumentation that overcomes the limitations of existing software-based and hardware-assisted instrumentation techniques, namely their affecting program execution. It is a further object of some embodiments to enable comprehensive sampling of processor state elements, including both register file contents and internal processor state elements, without interrupting or otherwise affecting program execution. In such embodiments dedicated hardware circuitry is integrated within a hardware processor for asynchronous sampling of processor state elements, including processor state elements not otherwise visible to software executing on the hardware processor(s), and separate collector circuitry is provided for processing sampled data while the monitored hardware processor(s) continue normal operation, thereby eliminating interference between instrumentation and program execution.

Some embodiments described in the present disclosure provide a system for non-intrusive processor instrumentation comprising one or more hardware processors configured to execute a software program, wherein at least one hardware processor comprises sampler circuitry configured to sample a plurality of processor internal values without interrupting execution of the software program. The system further comprises at least one collector circuitry coupled to the sampler circuitry and configured to receive the plurality of processor internal values from the sampler and process the plurality of processor internal values while the one or more hardware processors continue normal operation.

The asynchronous operation of the sampler circuitry eliminates the observer effect that compromises measurement accuracy in conventional synchronous instrumentation techniques, as well as interferes with the system's normal intended operation, thereby enabling collection of processor performance data that accurately reflects the true operational characteristics of unmodified software programs. The integration of sampler circuitry within the hardware processor provides direct access to internal processor state elements that are not accessible through conventional register file interfaces, including specialized components such as branch prediction units, cache controllers, and pipeline management circuitry, thereby enabling comprehensive visibility into processor operation that extends far beyond the capabilities of existing software-based and hardware-assisted instrumentation approaches.

Additionally or alternatively, the separation of sampling functionality from collection and processing functionality enables the system to achieve non-intrusive operation while maintaining comprehensive data analysis capabilities. The collector circuitry operates independently of the monitored processors, thereby ensuring that data processing activities do not consume processor resources or interfere with normal program execution, while simultaneously enabling sophisticated real-time analysis of sampled processor internal values. Furthermore, the collector circuitry provides significant advantages in data collection efficiency by enabling intelligent processing and storage of instrumentation data rather than simply accumulating raw sampled values.

The foregoing and other objects are achieved by the features of the independent claims. Further implementation forms are apparent from the dependent claims, the description and the figures.

According to a first aspect, a system for non-intrusive processor instrumentation comprises: one or more hardware processors configured to execute a software program, wherein at least one hardware processor of the one or more hardware processors comprises sampler circuitry configured to sample a plurality of processor internal values, where each processor internal value is a value of one of a plurality of processor state elements, without interrupting execution of the software program; and at least one collector circuitry coupled to the sampler circuitry, configured to receive the plurality of processor internal values from the sampler circuitry and process the plurality of processor internal values while the one or more hardware processors continue normal operation.

According to a second aspect, a method for non-intrusive processor instrumentation comprises: executing a software program by one or more hardware processors; sampling, by sampler circuitry integrated within at least one hardware processor of the one or more hardware processors, a plurality of processor internal values without interrupting execution of the software program, where each processor internal value of the plurality of processor internal values is a value of one of a plurality of processor state elements; receiving, by at least one collector circuitry coupled to the sampler circuitry, the plurality of processor internal values from the sampler circuitry; and processing, by the at least one collector circuitry, the plurality of processor internal values while the one or more hardware processors continue normal operation.

According to a third aspect, a processor comprises: execution circuitry configured to execute instructions of a software program; a register file accessible to the execution circuitry; at least one internal component having state information not stored in the register file; and sampler circuitry integrated within the processor and configured to sample a plurality of processor internal values, where each processor internal value is a value of one of a plurality of processor state elements, including values from the register file and the state information without interrupting operation of the execution circuitry, and configured to be coupled to at least one collector circuitry, where the at least one collector circuitry is configured to receive and process the plurality of processor internal values while the execution circuitry continues to execute the instructions.

According to a fourth aspect, a software program product for non-intrusive processor instrumentation comprises: a non-transitory computer readable storage medium; first program instructions for executing a software program by one or more hardware processors, where at least one of the one or more hardware processors comprises integrated sampler circuitry; second program instructions for configuring the sampler circuitry to control sampling of a plurality of processor internal values without interrupting execution of the software program; and third program instructions for analyzing, by at least one management component, processed data received from at least one collector circuitry, wherein the at least one collector circuitry is coupled to the sampler circuitry and configured to receive the plurality of processor internal values from the sampler circuitry; wherein the first, second, and third program instructions are executed by at least one computerized processor from the non-transitory computer readable storage medium.

With reference to the first and second aspects, in a first possible implementation of the first and second aspects the plurality of processor internal values comprises at least one internal state value of at least one processor component of the at least one hardware processor. Optionally the at least one processor component includes at least one of: a prefetch buffer, a Branch Prediction Unit (BPU), a pipeline management circuitry, a cache controller, an Instruction Fetch Unit (IFU), a microcode cache, and a memory subsystem. Optionally, the at least one internal state value is not accessible via a register file of the at least one hardware processor. Retrieving one or more internal state values of a processor component that is not accessible via a register file increases accuracy of one or more management operations performed based on the one or more internal state values compared to other management operations performed based only on values of the register file. Optionally, the plurality of processor internal values comprises a copy of at least part of a register file of the at least one hardware processor. Including a copy of the at least part of the register file allows retrieving together both commonly visible state values and internal state values. This allows simplifying the implementation of the collection circuitry, for example by removing the need to synchronize state values retrieved separately through separate retrieval mechanisms (both temporal synchronization and source hardware processor synchronization), one or more for the internal values via the sampler and one or more others for the register file. Also, this allows retrieving file register values without impacting execution of the software program, compared to reading the file register using computer instructions of the executing software program. Optionally, the sampler circuitry is further configured to send an event indicator. Sending an event indicator further increases accuracy of operation of one or more components that receive the event indicator, for example a management component. Sending an event indicator also increases accuracy of tracking events in time, for example when sent to a timer. Sending an event indicator additionally facilitates one or more timer operations associated with an event, for example starting or stopping a down-counter or an up-counter.

With reference to the first and second aspects, in a second possible implementation of the first and second aspects the sampler circuitry is configurable to control when to sample the plurality of processor internal values based on at least one of: a periodic clock cycle, an identified program counter value, or a trigger instruction in the software program. Optionally, the method further comprises configuring the sampler circuitry to control when to sample the plurality of processor internal values based on at least one of: a periodic clock cycle, an identified program counter value, or a trigger instruction in the software program. Selecting when to sample the plurality of processor internal values increases usability of the processor internal values, for example allowing adapting the sampling to a particular management task, and thus improves accuracy of the particular management task. For example, periodic sampling may be useful to track resource usage and other performance metrics over time. Sampling based on a trigger instruction in the software program or based on an identified program counter value may be useful for program analysis.

With reference to the first and second aspects, in a third possible implementation of the first and second aspects the at least one collector circuitry is configured to: perform an analysis of the plurality of processor internal values; and store an outcome of the analysis. Performing an analysis of the internal values and storing an outcome of the analysis allows reducing an amount of storage needed by the collector circuitry. Optionally, processing the plurality of processor internal values comprises performing an analysis to reduce storage space requirements. Optionally, the analysis includes calculating at least one of: an average value of a plurality of processor internal values collected over time, a minimum value of a plurality of processor internal values collected over time, or a maximum value of a plurality of processor internal values collected over time. Optionally, the system further comprises a management component configured to receive processed data from the at least one collector circuitry and perform another analysis of the processed data. Optionally, the method further comprises providing processed data from the at least one collector circuitry to the management component for optimization of the software program. Optionally, the management component computes an optimized software program using an outcome of the other analysis, improving at least one performance metric of executing the software program. Optionally, the system further comprises at least one other hardware processor, connected to the one or more hardware processors. Optionally, the management component comprises at least one software object executed by the at least one hardware processor.

With reference to the first and second aspects, in a fourth possible implementation of the first and second aspects sampling the plurality of processor internal values occurs asynchronously to the execution of the software program. Sampling the plurality of processor internal values asynchronously to the execution of the software program reduces a negative impact to the performance of the software program in order to collect the processor internal values.

With reference to the third aspect, in a first possible implementation of the third aspect the sampler circuitry is configured to operate asynchronously to the execution circuitry.

With reference to the third aspect, in a second possible implementation of the third aspect the plurality of processor internal values comprises state information of at least one of: a prefetch buffer, a Branch Prediction Unit (BPU), a pipeline management circuitry, a cache controller, an Instruction Fetch Unit (IFU), a microcode cache, and a memory subsystem.

With reference to the third aspect, in a third possible implementation of the third aspect the sampler circuitry is configurable to sample the plurality of processor internal values based on at least one of: a periodic clock cycle, an identified program counter value, or an instruction in the software program.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments pertain. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

DETAILED DESCRIPTION

Figure 1:
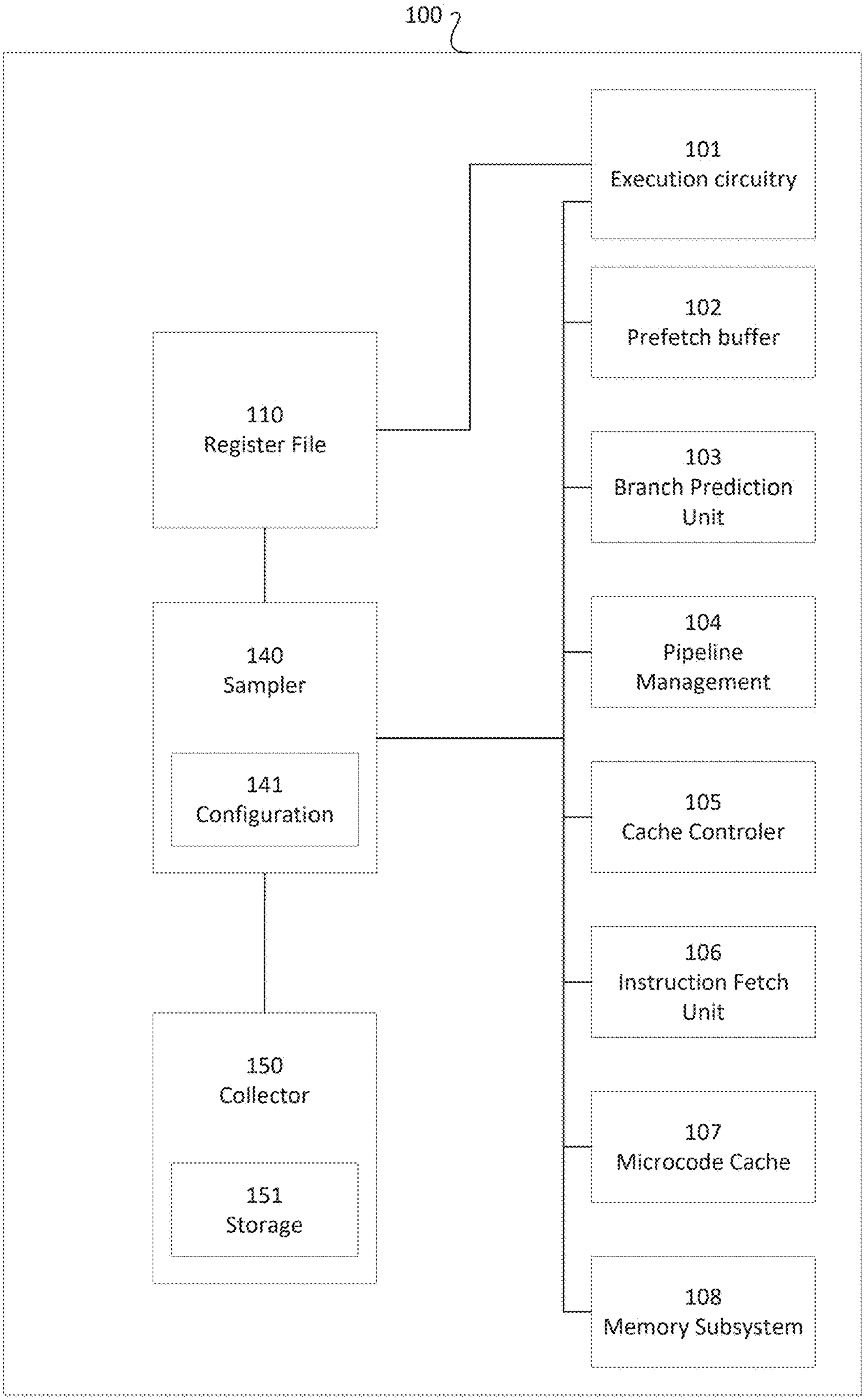
FIG. 1 is a schematic block diagram of an exemplary hardware processor, according to some embodiments.

Some embodiments described in the present disclosure relate to a computerized system executing a software program and, more specifically, but not exclusively, to sampling values of processor state elements while executing the software program.

While PMUs represent an advancement over purely software-based instrumentation, they remain fundamentally limited in their ability to provide comprehensive visibility into processor operation without affecting the monitored system. The predetermined nature of PMU event counters means that many critical internal processor state elements remain inaccessible, and the requirement for software intervention to collect and process PMU data perpetuates the resource consumption and timing interference issues that compromise measurement accuracy in performance-critical applications.

The limitations of existing instrumentation techniques become particularly problematic in performance-critical applications where even minimal execution overhead is unacceptable. Some examples of such applications include, but are not limited to, real-time control systems, high-frequency trading platforms, embedded systems with strict timing constraints, and high-performance computing applications. In these contexts, the inability to collect comprehensive processor state information without affecting program execution represents a significant impediment to system performance analysis in general, and in particular performance optimization efforts. Furthermore, even existing instrumentation techniques that are hardware-assisted require software involvement to collect the sampled data, requiring the processor's execution pipeline to handle both program execution and instrumentation data management activities.

There is a need to collect runtime information, that is information collected while a hardware processor executes a software program, of processor internal values of processor state elements beyond what is visible through the hardware processor's register file, and there is a need to do so without interfering with normal execution of the software program.

As used herein, the term "processor internal values" refers to actual data content retrieved from processor state elements during sampling operations. Some examples of processor internal values include, but are not limited to, register contents, cache line states, branch prediction confidence values, pipeline stage indicators, and any other data that represents the state of processor state elements at a given point in time.

As used herein, the term "internal state value" refers to a value representing a current state of a processor component or processing element at a specific point in time, wherein the internal state value optionally comprises numerical values, status indicators, configuration parameters, or other data maintained by processor components during operation. Some examples of internal state values include, but are not limited to, a branch prediction accuracy metric maintained by a Branch Prediction Unit (BPU), a cache hit/miss counter maintained by a cache controller, a pipeline stage occupancy indicator maintained by pipeline management circuitry, a prefetch buffer fill level, instruction decode status information, a program counter value, a frame pointer value, and execution unit availability status. For brevity, henceforth the term "internal state value" is used to mean any data value that represents at least part of the operational state of a processor component and the terms are used interchangeably.

As used herein, the term "non-intrusive" refers to a property of instrumentation whereby processor internal values are collected without modifying a software program executed by a hardware processor, without inserting additional instructions into the software program, and without interrupting or otherwise affecting the normal execution flow of the software program. Non-intrusive operation is achieved through the use of dedicated hardware circuitry that operates independently of the processor's execution pipeline.

The present disclosure addresses the fundamental limitations of existing processor instrumentation techniques by providing, in some embodiments described herewithin, a hardware-based non-intrusive solution that separates the sampling function from program execution and from data processing of the sampled data, enabling comprehensive data collection without execution interference.

In such embodiments, a system comprises sampler circuitry integrated within a monitored hardware processor, collector circuitry for data processing, and optionally a management component for higher-level analysis and optimization.

As used herein, the term "sampler circuitry" refers to one or more hardware components integrated within a hardware processor and specifically designed to access and copy processor internal values from one or more processor state elements of the hardware processor without interfering with normal processor operation. The sampler circuitry operates independently of the hardware processor's execution pipeline and does not compete for execution resources with a software program being executed by one or more hardware processors comprising the hardware processor.

As used herein, the term "collector circuitry" refers to one or more other hardware components, optionally separate from the one or more hardware processors, that receive processor internal values from one or more sampler circuitries and optionally perform one or more processing operations on the received data. Optionally, the collector circuitry operates asynchronously with respect to both the one or more sampler circuitries and the one or more hardware processor's execution pipelines, enabling continuous data processing without affecting program execution timing.

As used herein, the term "asynchronous operation" refers to the characteristic of the instrumentation solution wherein sampling and data collection activities occur independently of and without synchronization to execution of the software program by the one or more hardware processors. Asynchronous operation ensures that instrumentation activities do not introduce delays, stalls, or other timing interferences that could affect execution characteristics of the software program executed by the one or more hardware processors.

Optionally, the sampler circuitry provides direct hardware access to processor state elements that are not accessible through traditional software instrumentation techniques. Unlike conventional approaches that rely on software instructions to read register files, the sampler circuitry can optionally access internal processor state elements such as branch prediction unit registers, cache coherency state information, pipeline control registers, and other microarchitectural elements that contain performance and behavioral data. Integration of sampler circuitry within a hardware processor enables access to processor state elements at the hardware level without requiring software intervention or execution pipeline resources. The sampler circuitry optionally comprises dedicated data paths and control logic that read processor state elements in parallel with normal processor operation, ensuring that sampling activities do not compete with program execution for shared resources.

Optionally, sampling operations of the sampler circuitry are configurable, through a configuration interface of the sampler circuitry, to allow precise control over which processor internal values are collected, and when they are collected. Optionally, the configuration interface allows configuration of one or more sampling triggers. Some examples of a sampling trigger include, but are not limited to, a periodic sampling based on a number of clock cycles, an event-driven sampling based on a program counter value, an instruction-based trigger embedded within the software program, and a conditional trigger based on a processor state change. Optionally, the configuration interface allows configuration of one or more processor state elements to sample. The flexibility of configuring which processor state elements to sample and what triggers the sampling enables tailored data collection strategies optimized for specific analysis requirements.

Optionally, the collector circuitry provides dedicated processing capabilities for handling a continuous stream of processor internal values generated by the sampler circuitry. By implementing data processing functions in circuitry that is separate from the sampler circuitry, the collector circuitry may eliminate the need for the monitored processor to perform instrumentation-related computations, thereby maintaining complete separation between program execution and data collection activities.

Processing operations performed by the collector circuitry optionally include data aggregation, statistical analysis, compression, filtering, and storage management functions. Some examples of statistical analysis operations include, but are not limited to, calculation of average values of a processor state element over time, identification of minimum and maximum values of a processor state element, computation of variance and standard deviation of a plurality of value of a processor state element, detection of pattern changes in a plurality of values of one or more processor state elements, and generation of histograms and frequency distributions of a plurality of values of one or more processor state elements. These processing operations may serve to reduce the volume of sampled data while preserving the essential characteristics of the collected processor internal values. This may serve to reduce an amount of memory required to store the sampled data, and additionally or alternatively, the volume of data that is transmitted to other analysis components The collector circuitry optionally implements data reduction techniques to address storage and bandwidth limitations associated with high-frequency sampling of processor state elements. Rather than storing all collected processor internal values, the collector circuitry optionally processes the sampled data in real-time and stores only processed results or summary statistics. This approach significantly reduces storage requirements while maintaining the ability to reconstruct important performance characteristics from the processed data.

Optionally, data communication between the sampler circuitry and collector circuitry is implemented through one or more dedicated hardware interfaces that operate independently of the processor's normal instruction and data pathways. These interfaces optionally comprise high-speed serial links, parallel data buses, or other communication mechanisms suitable for transferring processor internal values without affecting processor performance. The one or more communication interfaces are optionally designed to handle potentially high data rates generated by frequent sampling of multiple processor state elements.

Optionally, the system comprises a management component, providing coordination and additional analysis capabilities that extend beyond the data collection of the sampler circuitry and the processing functions of the collector circuitry. Optionally, the management component comprises one or more software components executed on the same processor system or on separate processing hardware.

Management component functions optionally include configuration of sampling parameters in the sampler circuitry, coordination of multiple sampler and collector pairs, integration of data from multiple sources, long-term trend analysis, and generation of optimized software programs based on collected performance data. The management component may implement analysis algorithms that utilize the comprehensive processor state information made available through the hardware-based instrumentation system to identify optimization opportunities that would not be detectable through traditional software instrumentation techniques.

The system architecture described in some embodiments of the present disclosure supports various deployment configurations to accommodate different performance requirements and system constraints. In some embodiments, multiple sampler circuits are integrated within a single processor to monitor different processor state elements or different execution contexts simultaneously. Multiple collector circuits may be deployed to handle data streams from multiple sampler circuitries, optionally with each collector specialized for processing specific types of processor internal values.

This scalability of the system enables deployment in complex multi-processor environments where comprehensive instrumentation of multiple processors is required. In such configurations, collector circuits optionally aggregate data from multiple processors, and management components optionally coordinate system-wide analysis and optimization activities. Optionally, each of a plurality of sampler circuitries is integrated in one of one or more hardware processors. Optionally, the plurality of sampler circuitries are all connected to a common collector circuitry. This capability is particularly valuable in high-performance computing environments where understanding the interaction between multiple processors is essential for system optimization.

Optionally, the sampler comprises event indication capabilities, providing additional instrumentation functionality beyond basic data collection. Event indicators optionally comprise signals or data that notify other system components about specific conditions or state changes detected during processor monitoring. Some examples of events that trigger event indications include, but are not limited to, detection of a specific processor internal value of an identified processor state element, identification of unusual execution patterns, occurrence of performance anomalies, and reaching of predetermined threshold conditions.

Event indicators may be communicated to various system components depending on the specific implementation and analysis requirements. Optionally, an event indicator is sent to the collector circuitry, for example for inclusion in processed data. Optionally, an event indicator is sent to the management component for analysis. Optionally, an event indication is sent to an external monitoring system, for example for real-time alerting. The flexibility of the event indications enables implementation of sophisticated monitoring and response mechanisms that can adapt to changing system conditions.

The asynchronous nature of the instrumentation system allows all sampling, data collection, and processing activities to occur without affecting the timing characteristics of the monitored software program. Asynchronous operation may be maintained through the use of independent clock domains, dedicated data pathways, buffer mechanisms that decouple the timing of instrumentation activities from program execution timing, or any combination thereof. The sampler circuitry optionally operates on a separate clock domain from the processor execution units, enabling sampling operations to proceed independently of execution pipeline timing. Similarly, the collector circuitry may operate asynchronously with respect to both the sampler circuitry and the hardware processor, ensuring that data processing activities do not create back-pressure that could affect sampling operations.

The comprehensive access to processor state elements provided by the disclosed system enables new categories of performance analysis and optimization that are not feasible with traditional instrumentation techniques. By providing visibility into internal processor state elements such as branch prediction unit states, cache coherency information, and pipeline control states, the proposed system enables detailed understanding of microarchitectural behavior that directly impacts program performance but is not visible through register file monitoring alone.

For example, analysis of branch prediction unit states can reveal patterns of misprediction that contribute to performance degradation, enabling optimization strategies that improve branch prediction accuracy. Similarly, monitoring of cache state information can identify memory access patterns that cause performance bottlenecks, leading to optimizations in data layout and memory management strategies. These types of optimizations are only possible when comprehensive processor state information is available through non-intrusive instrumentation techniques.

The hardware-based approach of the present disclosure also enables instrumentation of performance-critical applications that cannot tolerate the execution overhead associated with software instrumentation techniques. Real-time systems, high-frequency trading applications, and embedded systems with strict timing constraints can benefit from comprehensive performance monitoring without risk of timing violations or performance degradation.

The system supports various sampling strategies tailored to different analysis objectives and system constraints. High-frequency sampling can provide detailed timing information suitable for identifying short-term performance variations and transient effects. Lower-frequency sampling can be used for long-term trend analysis and system characterization with reduced data volumes and processing requirements. Adaptive sampling strategies can dynamically adjust sampling rates based on detected system conditions or analysis requirements.

Optionally, configuration flexibility is provided through programmable parameters in the sampler circuitry that control sampling behavior, data processing operations, and event detection criteria. These parameters are optionally adjusted during system operation to accommodate changing analysis requirements or to focus instrumentation efforts on specific aspects of system behavior. The configurability of the system enables its use across a wide range of applications and system types without requiring hardware modifications.

Optionally, the processor internal values collected through the disclosed instrumentation system includes information from any processor state elements accessible to the sampler circuitry. In addition to register file contents and branch prediction unit states, processor internal values optionally include cache line states, translation lookaside buffer contents, instruction and data pipeline registers, performance counter values, and any other processor state information that can provide insight into system performance and behavior.

The comprehensive nature of the data collection capability enables holistic analysis of processor behavior that considers the complex interactions between different processor subsystems. Traditional instrumentation techniques that provide access to only limited subsets of processor state cannot capture these interactions, limiting the effectiveness of optimization efforts based on the collected data.

Implementation of the disclosed system can be adapted to various processor architectures and system configurations while maintaining the core principles of non-intrusive, comprehensive instrumentation. The sampler circuitry design may be customized for specific processor architectures to access the particular processor state elements relevant to each architecture. Similarly, the collector circuitry and management components may be tailored to specific analysis requirements and system constraints of different deployment scenarios.

The disclosed system represents a significant advancement in processor instrumentation technology by providing hardware-based, non-intrusive access to comprehensive processor state information. This capability enables new levels of performance analysis and optimization that are not achievable through traditional software-based instrumentation techniques, particularly in performance-critical applications where execution overhead is unacceptable.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java, Object-Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), a coarse-grained reconfigurable architecture (CGRA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the following description, similar reference numbers were used to indicate the components and entities among the figures.

Reference is now made to FIG. 1, showing a schematic block diagram of an exemplary hardware processor 100, according to some embodiments. In such embodiments, hardware processor 100 comprises execution circuitry 101, optionally for executing at least part of a plurality of instructions of a software program. Optionally, hardware processor 100 comprises more than one execution circuitry. Optionally, execution circuitry 101 implements an execution pipeline.

Optionally, a plurality of processor state elements of hardware processor 100 comprises a first plurality of processor state elements and a second plurality of processor state elements. Optionally, hardware processor 100 comprises register file 110. Optionally, the first plurality of processor state elements are accessible to software executed by execution circuitry 101 via register file 110. Some examples of a processor state element accessible to software executed by execution circuitry via register file 110 include, but are not limited to a general purpose register, for example a data register, an address register and a working register for arithmetic and logical operations, a special purpose architectural registers, for example a program counter, a stack pointer and a status register, and a specialized computation register, for example a floating point unit register. Optionally, at least some of the first plurality of processor state elements, accessible through register file 110, are a set of processor state elements of execution circuitry 101.

Optionally, a plurality of processor components of hardware processor 100 comprises execution circuitry 101. Optionally, the plurality of processor components of hardware processor 100 comprises one or more other processor components, for example prefetch buffer 102, BPU 103, pipeline management circuitry 104, cache controller 105, Instruction Fetch Unit (IFU) 106, microcode cache 107, memory subsystem 108, or any combination thereof.

Optionally, the second plurality of processor state elements are processor state elements of at least one of the one or more other processor components. Optionally, the second plurality of processor state elements is not accessible via register file 110.

Optionally, hardware processor 100 comprises sampler circuitry 140. Optionally, sampler circuitry 140 is configured to sample a plurality of processor internal values, each processor internal value a value of one of the plurality of processor state elements of hardware processor 100. Optionally, sampler circuitry 140 is connected to register file and additionally or alternatively to at least one of the one or more other processor components in order to sample the plurality of processor internal values. Optionally, sampler circuitry 140 is configured to sample the plurality of processor internal values without interrupting execution of at least part of a software program executed by hardware processor 100, for example by execution circuitry 101.

Optionally, sampler circuitry 140 comprises configuration circuitry 141, configured to control operation of sampler circuitry 141. For example, configuration circuitry may comprise one or more triggers for sampling the plurality of processor internal values. Optionally, the configuration circuitry 141 comprises controls determining which processor state elements of hardware processor 100's plurality of processor state elements are sampled when sampling the plurality of processor internal values. Optionally, a configuration interface of configuration circuitry 141 enables external configuration of sampling parameters, for example through a software-based management component. The configuration interface optionally supports programming of one or more sampling triggers, additionally or alternatively selection of one or more processor state elements for monitoring, and further additionally or alternatively adjustment of sampling frequencies through register-based or memory-mapped configuration mechanisms. This configuration capability enables software program products to dynamically control the operation of the sampler circuitry while maintaining the hardware-based, non-intrusive nature of the actual sampling operations.

Optionally, hardware processor 100 comprises collector circuitry 150. Optionally, collector circuitry 150 is coupled to sampler circuitry 140. Optionally, the coupling between sampler circuitry 140 and collector circuitry 150 comprises at least one communication interface configured to transmit the plurality of processor internal values from the sampler circuitry 140 to the collector circuitry 150. Optionally, collector circuitry 150 is configured to receive the plurality of processor internal values while the at least part of the software program is executed by hardware processor 100. Optionally, the collector circuitry 150 is configured to process the plurality of processor internal values, optionally while the at least part of the software program is executed by hardware processor 100. Optionally, the collector circuitry 150 comprises storage 151, optionally for storing an outcome of analyzing the plurality of processor internal values.

Optionally, sampler circuitry 140 is further configured to send one or more event indicators, optionally to collector circuitry 150, optionally to an entity external to hardware processor 100. Some examples of an event that triggers an event indication include, but are not limited to, detection of a specific processor internal value of an identified processor state element, identification of an unusual execution pattern, occurrence of a performance anomaly, for example a performance exceeding an identified high watermark value or falling below an identified low watermark value, and reaching of one or more predetermined threshold conditions.

Figure 2:
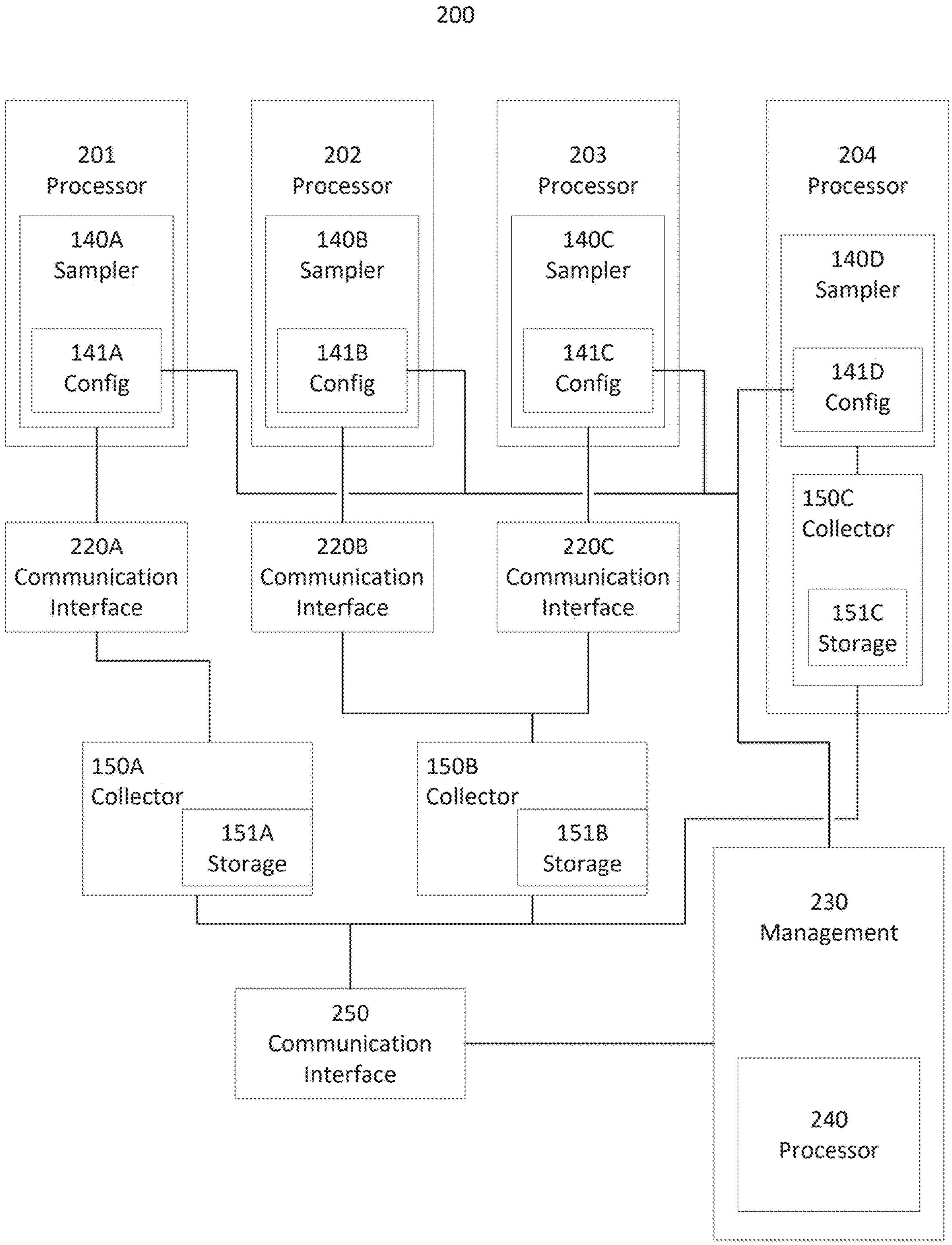
FIG. 2 is a schematic block diagram of an exemplary system, according to some embodiments.

Reference is now made also to FIG. 2, showing a schematic block diagram of an exemplary system 200, according to some embodiments. In such embodiments, system 200 comprises one or more hardware processors 201, 202, 203 and 204. A hardware processor may be any kind of programmable or non-programmable circuitry that is configured to carry out operations as described above and below. Optionally, one or more hardware processors 201, 202, 203 and 204 are configured to execute instructions of one or more software programs. In the embodiment shown in FIG. 2, any one or more of hardware processors 201, 202, 203 and 204 may be implemented as hardware processor 100 of FIG. 1, wherein a hardware processor implemented as hardware processor 100 optionally includes the sampler circuitry 140 and internal component architecture described with respect to FIG. 1. Optionally, a hardware processor implemented as hardware processor 100 includes collector circuitry 150.

For example, in some embodiments described herein, hardware processor 201 comprises the same components as processor 100 including sampler circuitry 140A including configuration circuitry 141A, hardware processor 202 comprises sampler circuitry 140B including configuration circuitry 141B, hardware processor 203 comprises sampler circuitry 140C including configuration circuitry 141C and hardware processor 204 comprises sampler circuitry 140D including configuration circuitry 141D, wherein each sampler circuitry has the same capabilities and architecture as sampler circuitry 140 including configuration circuitry 141 described with respect to FIG. 1.

System 200 further comprises one or more collector circuitries comprising collector circuitries 150A, 150B and 150C, each coupled to one or more sampler circuitries, wherein each collector circuitry has the same capabilities and architecture as collector circuitry 150 described with respect to FIG. 1. In this example, collector circuitry 150A is coupled to sampler circuitry 140A of hardware processor 201 and comprises storage 151A, collector circuitry 150B is coupled to sampler circuitry 150B of hardware processor 202 and sampler circuitry 140C of hardware processor 203 and comprises storage 151B, and collector circuitry 150C is coupled to sampler circuitry 140D of hardware processor 204 and comprises storage 151C.

Optionally, sampler circuitry 140A is coupled to collector circuitry 150A via communication interface 220A. Optionally, sampler circuitry 140A is directly connected to collector circuitry 150A such that communication interface 220A comprises physical wires, traces, buses or any combination thereof. Optionally, sampler circuitry 140A is connected to collector circuitry 150A indirectly through one or more intermediate components. Similarly, sampler circuitry 140B may be connected to collector circuitry 150B via communication interface 220B, and sampler circuitry 140C may be connected to collector circuitry 150B via communication interface 220C.

Optionally, collector circuitry 150C is implemented in hardware processor 204 and coupled to sampler circuitry 140D.

Optionally a hardware processor of the one or more hardware processors 201, 202, 203 and 204 does not comprise a sampler circuitry.

The flexible architecture of system 200 enables any combination of the hardware processors 201, 202, 203, and 204 to include the sampler circuitry functionality and additionally or alternatively the collector functionality, wherein at least one hardware processor of one or more hardware processors 201, 202, 203 and 204 includes sampler circuitry as described with respect to hardware processor 100 of FIG.

1. This configuration allows system 200 to scale monitoring capabilities based on specific requirements, wherein some processors may include full sampler circuitry functionality while others may operate as conventional processors without monitoring capabilities.

Optionally, one or more of sampler circuitries 140A, 140B, 140C and 140D may be connected to more than one collector circuitry. For example, sampler circuitry 140A may be connected to both collector circuitry 150A and collector circuitry 150B.

Optionally, system 200 comprises management component 230. Optionally, management component 230 is configured to receive processed data from the one or more collector circuitries 150A, 150B and 150C, optionally via other communication interface 250. Optionally, management component 230 comprises one or more software objects. Optionally, management component 230 comprises one or more management circuitries.

Optionally, system 200 comprises at least one other hardware processor 240. For brevity, henceforth the term "processing unit" is used to mean at least one other hardware processor and the terms are used interchangeably. The processing unit may be any kind of programmable or non-programmable circuitry that is configured to carry out the operations described above and below. The processing unit may comprise hardware as well as software. For example, the processing unit may comprise one or more processors and a transitory or non-transitory memory that carries a program which causes the processing unit to perform the respective operations when the program is executed by the one or more processors. Optionally, processing unit 240 is configured to execute the one or more software objects of management component 230.

Communication interfaces 220A, 220B, 220C and other communication interface 250 optionally comprise wired connections, wireless connections, or network interfaces.

Figure 3:
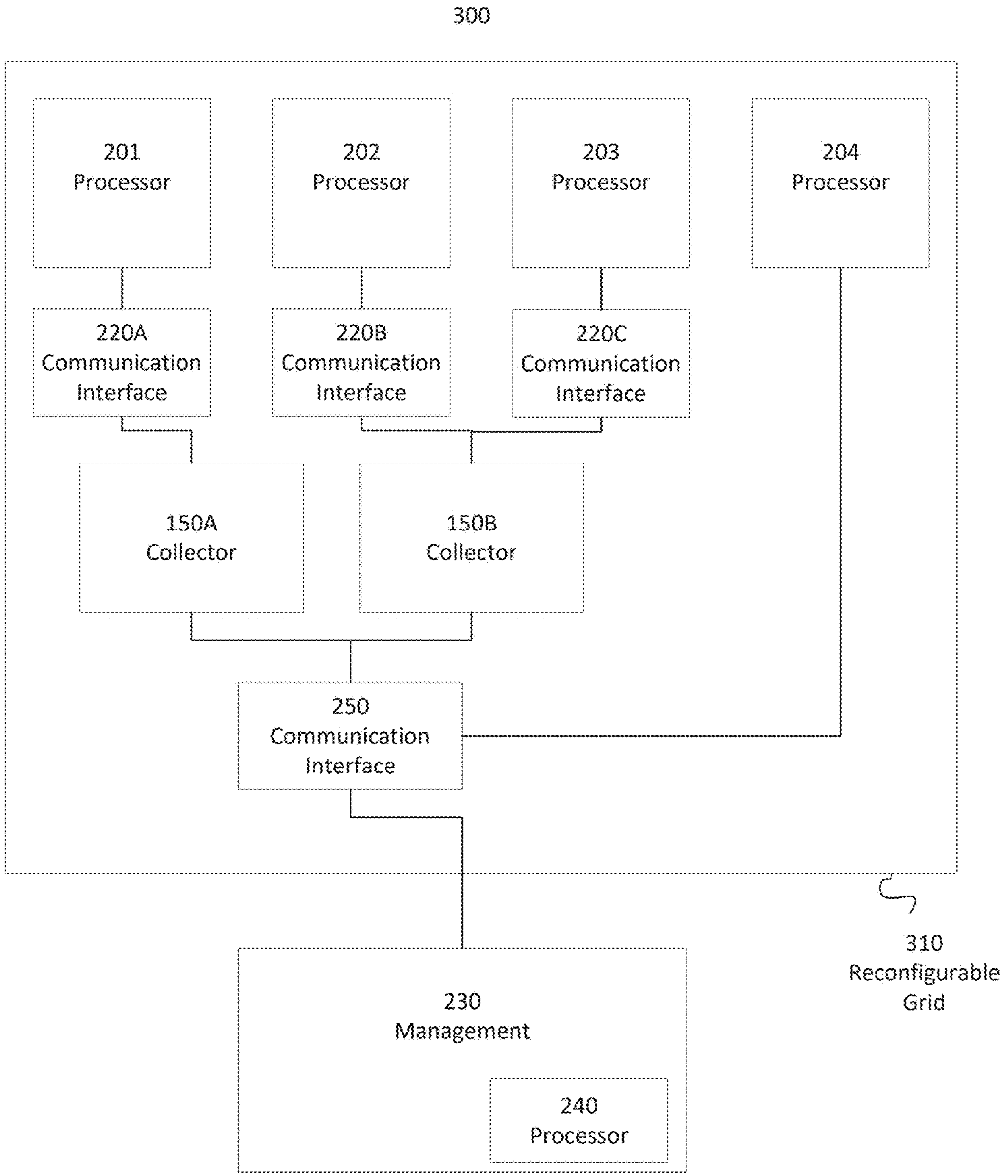
FIG. 3 is a schematic block diagram of another exemplary system, according to some embodiments.

In some embodiments, at least some components are implemented in a reconfigurable processing grid, where the reconfigurable processing grid comprises a plurality of reconfigurable logical elements connected via a plurality of reconfigurable routing junctions. Reference is now made also to FIG. 3, showing a schematic block diagram of another exemplary system 300, according to some embodiments. In such embodiments, a least one reconfigurable processing grid 310 comprises at least some of one or more hardware processors 201, 202, 203 and 204. Furthermore, in this example communication interfaces 220A, 220B and 220C, as well as collector circuitry 150A and collector circuitry 150B are implemented in at least one reconfigurable processing grid 310. Optionally, management component 230 is implemented in at least one reconfigurable processing grid 310. Optionally, at least one reconfigurable processing grid 310 comprises processing unit 240. Optionally, processing unit 240 is implemented externally to at least one reconfigurable processing grid 310 and is connected thereto, for example via communication interface 250, optionally implemented in the at least one reconfigurable processing grid 310.

To implement non-intrusive instrumentation, in some embodiments system 200 or system 300 implement the following optional method.

Figure 4:
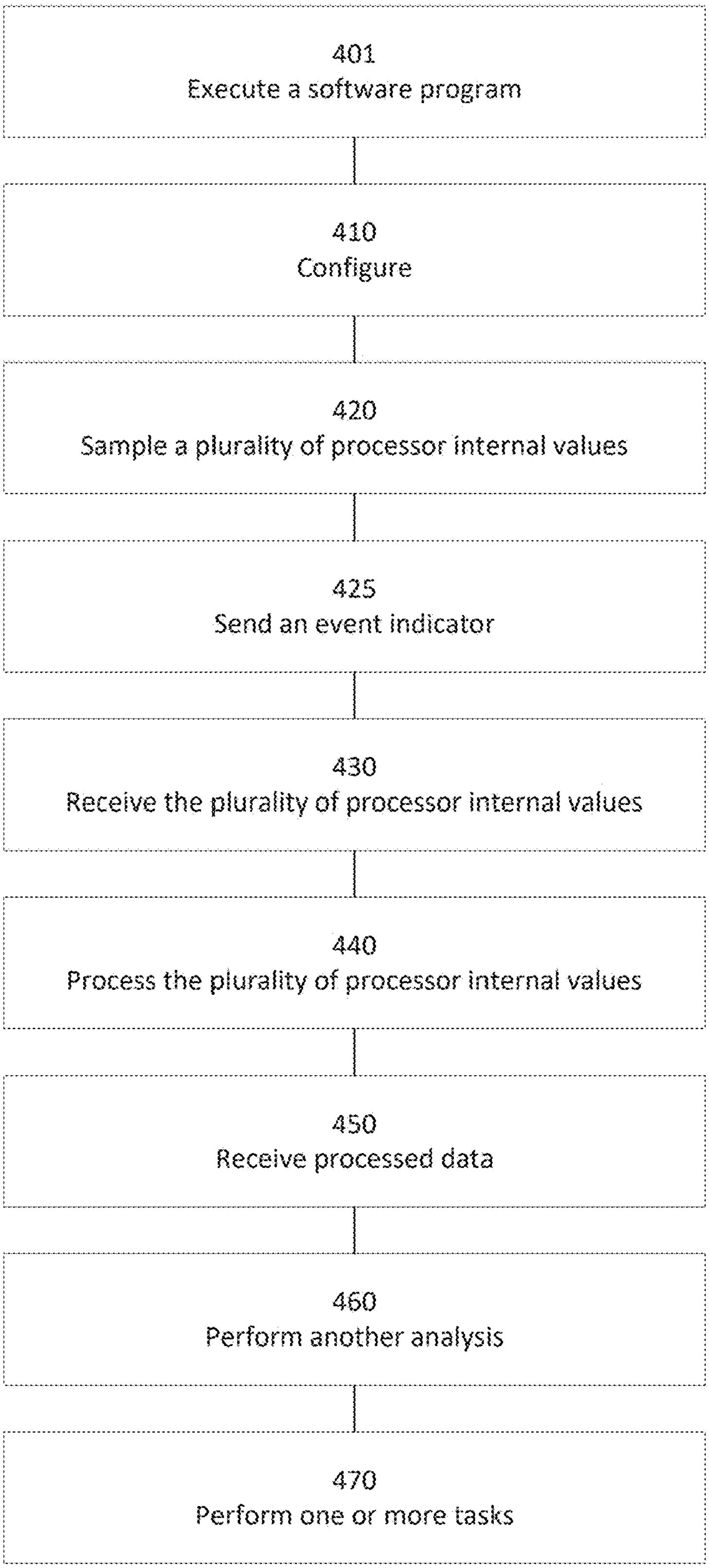
FIG. 4 is a flowchart schematically representing an optional flow of operations, according to some embodiments.

Reference is now made also to FIG. 4, showing a flowchart schematically representing an optional flow of operations 400, according to some embodiments. In such embodiments, in 401 one or more hardware processors 201, 202, 203 and 204 executes a plurality of instructions of a software program.

For simplicity the following description focuses on sampler circuitry 140A of hardware processor 201 and collector circuitry 150A to which sampler circuitry 140A is coupled, however the same method applies similarly to the other hardware processors, sampler circuitries and collector circuitries described in FIG. 2 and additionally or alternatively in FIG. 3.

The rest of method 400 is optionally executed while one or more hardware processors 201, 202, 203 and 204 executes the software program. Optionally, in 410 sampler circuitry 140A is configured to control when to sample a plurality of processor internal values of a plurality of processor state elements of hardware processor 201, and additionally or alternatively which processor state elements of hardware processor 201 to sample. Optionally, sampler circuitry 140A is configured by accessing configuration circuitry 141A. Optionally, processing unit 240 configures sampler circuitry 140A, optionally by accessing configuration circuitry 141A, optionally by executing one or more configuration computer instructions to configure sampler circuitry 140A. Optionally the one or more configuration computer instructions access configuration circuitry 141A. Optionally, sampler circuitry 140A is configured to sample the plurality of internal values based on a periodic clock cycle, for example every cycle or a schedule of cycles. The schedule of cycles may be periodic. Optionally, sampler circuitry 140A is configured to sample the plurality of internal values based on an identified program counter value or on one or more identified program counter values. Optionally, sampler circuitry 140A is configured to sample the plurality of internal values based on a trigger instruction in a software program executed at least in part by hardware processor 201. Optionally, sampler circuitry 140A is configured to sample the plurality of processor internal values based on more than one trigger.

Optionally, collector circuitry 150A is configured, for example to control how collector circuitry 150 processes the plurality of processor internal values received from sampler circuitry 140A and additionally or alternatively what outcomes to store.

In 420, sampler circuitry 140A samples a plurality of processor internal values of hardware processor 201, optionally without interrupting execution of the software program. Optionally, sampling the plurality of processor internal values occurs asynchronously to the execution of the software program. Optionally, the plurality of processor internal values comprises one or more internal state value of at least one of processor components execution pipeline 101, prefetch buffer 102, BPU 103, pipeline management circuitry 104, cache controller 105, IFU 106, microcode cache 107, or memory subsystem 108, or any combination thereof. Optionally, the one or more internal state value is not accessible via register file 110. Optionally, the plurality of processor internal values comprises a copy of at least part of register file 110. Optionally, the plurality of processor internal values comprises one or more internal state values of execution pipeline 101 that are not in register file 110.

Optionally, in 425 sampler circuitry 140A sends an event indicator. Optionally, sampler circuitry 140A sends the event indicator to collector circuitry 150A. Optionally, sampler circuitry 140A sends the event indicator to management component 230. Optionally, sampler circuitry 140A sends the event indicator to a timer. Optionally, the timer is in another hardware processor which may be processing unit 240 and additionally or alternatively another hardware processor (not shown). Optionally, the timer is in the controller circuitry 150A. Optionally the event indicator includes a timer increment values.

In 430, collector circuitry 150A optionally receives the plurality of processor internal values. Optionally, sampler circuitry 140A sends the plurality of processor internal values to collector circuitry 150A. In 440, collector circuitry 150A optionally processes the plurality of processor internal values.

Figure 5:
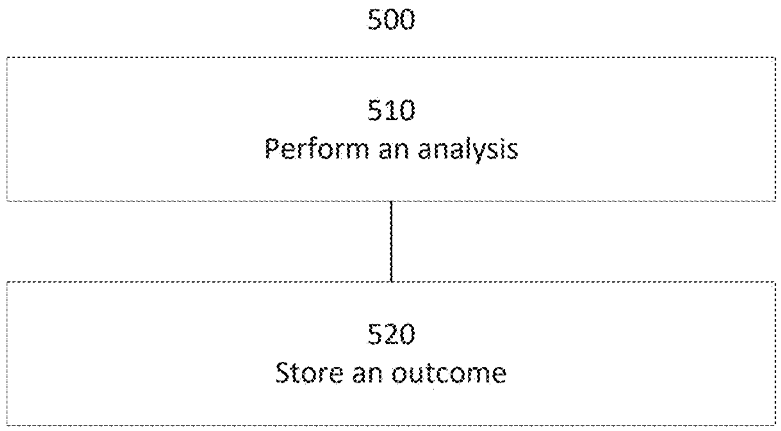
FIG. 5 is a flowchart schematically representing an optional flow of operations for a collector circuitry, according to some embodiments.

Reference is now made also to FIG. 5, showing a flowchart schematically representing an optional flow of operations 500 for a collector circuitry, according to some embodiments. In such embodiments, in 510 controller circuitry 150A performs an analysis of the plurality of processor internal values. Optionally, the analysis includes calculating an average value of a plurality of processor internal values collected over time, for example a plurality of values of an identified processor state element. Similarly, the analysis may include calculating a minimum value of a plurality of processor internal values collected over time and additionally or alternatively a maximum value of a plurality of processor internal values collected over time. Optionally, the analysis is performed to reduce storage requirements, by storing an outcome of the analysis instead of storing all received processor internal values received from sampler circuitry 140A. In 520 controller circuitry 150A optionally stores an outcome of the analysis in storage 151A.

Reference is now made again to FIG. 4. In 450, management component 230 optionally receives processed data from collector circuitry 150A. Optionally, the processed data was stored in storage 151A, optionally an outcome of one or more analysis performed by collector circuitry. Optionally, management component 230 additionally receives other processed data from one or more of collector circuitries 150B or 150C.

In 460 management component 230 optionally performs another analysis of the processed data. In 470, management component 230 optionally performs one or more tasks using an outcome of the other analysis. For example management component 230 may compute an optimized software program using the outcome of the other analysis. Optionally, the optimized software program improves one or more performance metrics of executing the software program. For example, the optimized software program may increase throughput of the software program. Additionally, or alternatively, the optimized software program may reduce the software program's latency. Optionally, the optimized software program may reduce an amount of memory used by the software program. Optionally, when system 200 or system 300 comprises one or more non-volatile storages (not shown in FIG. 2 or FIG. 3), the optimized software program may reduce an amount of storage used by the software program in the one or more non-volatile storages.

Optionally, the one or more hardware processors 201, 202, 203 and 204 are configured to execute the optimized software program instead of the software program. Optionally, system 200 and additionally or alternatively system 300 repeat execution of method 400 with one or more hardware processors 201, 202, 203 and 204 executing the optimized software program in 401.

Figure 6:
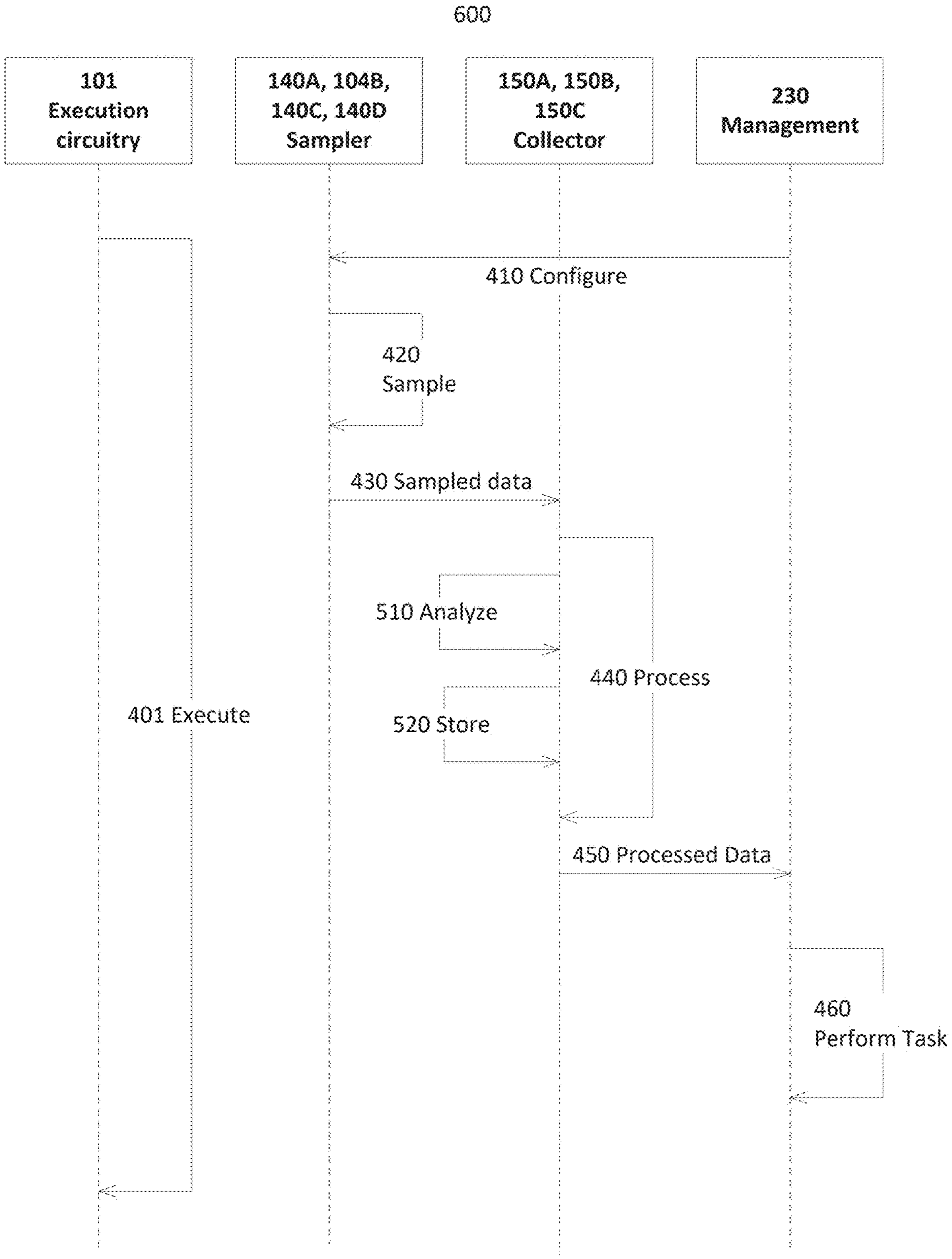
FIG. 6 is a sequence diagram of another optional flow of operations, according to some embodiments.

Reference is now made also to FIG. 6, showing a sequence diagram 600 illustrating the temporal relationships between operations performed by the one or more hardware processors 210, 202, 203, and 204, sampler circuitries 140A, 140B, 140C and 140D, one or more collector circuitries 150A, 150B and 150*c* and management component 230 according to various embodiments. The sequence diagram depicts the asynchronous and parallel nature of the instrumentation system operations during execution of a software program.

In the sequence diagram, the vertical dotted lines represent lifelines for different system components, with time progressing from top to bottom. For visual clarity, a separate lifeline is shown for each component, but these all operate within the same temporal framework. Reference numbers used in this sequence diagram correspond to the same elements introduced in earlier figures but are now arranged to show their temporal relationships and interactions during execution of the software program.

The execution circuitry 101 lifeline shows continuous program execution 401 throughout the instrumentation process. The lifeline for sampler circuitries 140A, 140B, 140C and 140D demonstrates their independent sampling operations, while the lifeline for collector circuitries 150A, 150B and 150C illustrates their parallel data processing activities. The management component 230 lifeline shows its coordination and analysis functions.

The sequence begins with 410, wherein the management component 230 optionally configures the sampler circuitries, optionally to establish sampling parameters and additionally or alternatively sampling triggers. Optionally, the sampler circuitries perform sampling operation 420, which occurs asynchronously with respect to program execution by the execution circuitry 101. The sampled data is optionally transmitted in 430 from the sampler circuitries to the respective collector circuitries.

The collector circuitries optionally perform processing operation 440, which optionally includes analysis operations 510 and storage operations 520 as detailed in FIG. 5. These processing activities optionally occur in parallel with continued program execution and additional sampling operations, demonstrating the non-intrusive nature of the system. The processed data is optionally transmitted via in 450 from the collector circuitries to the management component 230.

The management component 230 optionally performs other analysis operation 460 on the received processed data and optionally executes one or more tasks in 470, optionally based on an outcome of the other analysis. All instrumentation activities represented in the sequence diagram optionally occur while the execution circuitry 101 continues normal program execution operation 401, illustrating the asynchronous and non-interfering operation of the disclosed instrumentation system. Optionally, 420, 425, 430, 440, 450, 460 and 470 are repeated more than once while one or more hardware processors 201, 202, 203 and 204 continue normal operation.

The sequence diagram 600 demonstrates that multiple sampling, processing, and analysis cycles can occur simultaneously, with each component operating independently according to its designated function while maintaining the overall coordination necessary for comprehensive processor instrumentation.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant processor state elements will be developed and the scope of the term "processor state element" is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for non-intrusive processor instrumentation, comprising:

one or more hardware processors configured to execute a software program, wherein at least one hardware processor of the one or more hardware processors comprises:

at least one internal component having state information not stored in a register file of the at least one hardware processor; and sampler circuitry connected to the at least one internal component and configured to sample a plurality of processor internal values, including the state information of the at least one internal component, where each processor internal value is a value of one of a plurality of processor state elements, without interrupting execution of the software program; and at least one collector circuitry coupled to the sampler circuitry, configured to receive the plurality of processor internal values from the sampler circuitry and process the plurality of processor internal values while the one or more hardware processors continue normal operation.

2. The system of claim 1, wherein the plurality of processor internal values comprises at least one internal state value of at least one processor component of the at least one hardware processor.

3. The system of claim 2, wherein the at least one processor component includes at least one of: a prefetch buffer, a Branch Prediction Unit (BPU), a pipeline management circuitry, a cache controller, an Instruction Fetch Unit (IFU), a microcode cache, and a memory subsystem.

4. The system of claim 2, wherein the at least one internal state value is not accessible via a register file of the at least one hardware processor.

5. The system of claim 1, wherein the plurality of processor internal values comprises a copy of at least part of a register file of the at least one hardware processor.

6. The system of claim 1, wherein the sampler circuitry is configurable to control when to sample the plurality of processor internal values based on at least one of: a periodic clock cycle, an identified program counter value, or a trigger instruction in the software program.

7. The system of claim 1, wherein the at least one collector circuitry is configured to:

perform an analysis of the plurality of processor internal values; and store an outcome of the analysis.

8. The system of claim 7, wherein the analysis includes calculating at least one of: an average value of a plurality of processor internal values collected over time, a minimum value of a plurality of processor internal values collected over time, or a maximum value of a plurality of processor internal values collected over time.

9. The system of claim 1, further comprising a management component configured to receive processed data from the at least one collector circuitry and perform another analysis of the processed data.

10. The system of claim 9, wherein the management component computes an optimized software program using an outcome of the other analysis, improving at least one performance metric of executing the software program.

11. The system of claim 1, wherein the sampler circuitry is further configured to send an event indicator.

12. A method for non-intrusive processor instrumentation, comprising:

executing a software program by one or more hardware processors, wherein at least one hardware processor of the one or more hardware processors comprises at least one internal component having state information not stored in a register file of the at least one hardware processor, and sampler circuitry integrated within the at least one hardware processor and connected to the at least one internal component;

sampling, by the sampler circuitry, a plurality of processor internal values, including the state information of the at least one internal component, without interrupting execution of the software program, where each processor internal value of the plurality of processor internal values is a value of one of a plurality of processor state elements;

receiving, by at least one collector circuitry coupled to the sampler circuitry, the plurality of processor internal values from the sampler circuitry; and processing, by the at least one collector circuitry, the plurality of processor internal values while the one or more hardware processors continue normal operation.

13. The method of claim 12, wherein sampling the plurality of processor internal values occurs asynchronously to the execution of the software program.

14. The method of claim 12, further comprising configuring the sampler circuitry to control when to sample the plurality of processor internal values based on at least one of: a periodic clock cycle, an identified program counter value, or a trigger instruction in the software program.

15. The method of claim 12, wherein processing the plurality of processor internal values comprises performing an analysis to reduce storage space requirements.

16. The method of claim 12, further comprising providing processed data from the at least one collector circuitry to a management component for optimization of the software program.

17. A processor comprising:

execution circuitry configured to execute instructions of a software program;

a register file accessible to the execution circuitry;

at least one internal component having state information not stored in the register file; and sampler circuitry, integrated within the processor, connected to the at least one internal component, and configured to sample a plurality of processor internal values, where each processor internal value is a value of one of a plurality of processor state elements, including values from the register file and the state information of the at least one internal component without interrupting operation of the execution circuitry, and configured to be coupled to at least one collector circuitry, where the at least one collector circuitry is configured to receive and process the plurality of processor internal values while the execution circuitry continues to execute the instructions.

18. The processor of claim 17, wherein the sampler circuitry is configured to operate asynchronously to the execution circuitry.

19. The processor of claim 17, wherein the plurality of processor internal values comprises state information of at least one of: a prefetch buffer, a Branch Prediction Unit (BPU), a pipeline management circuitry, a cache controller, an Instruction Fetch Unit (IFU), a microcode cache, and a memory subsystem.

20. The processor of claim 17, wherein the sampler circuitry is configurable to sample the plurality of processor internal values based on at least one of: a periodic clock cycle, an identified program counter value, or an instruction in the software program.

21. A software program product for non-intrusive processor instrumentation comprises:

a non-transitory computer readable storage medium;

first program instructions for executing a software program by one or more hardware processors, where at least one of the one or more hardware processors comprises at least one internal component having state information not stored in a register file of the at least one hardware processor, and integrated sampler circuitry connected to the at least one internal component;

second program instructions for configuring the sampler circuitry to control sampling of a plurality of processor internal values, including the state information of the at least one internal component, without interrupting execution of the software program; and third program instructions for analyzing, by at least one management component, processed data received from at least one collector circuitry, wherein the at least one collector circuitry is coupled to the sampler circuitry and configured to receive the plurality of processor internal values from the sampler circuitry;

wherein the first, second, and third program instructions are executed by at least one computerized processor from the non-transitory computer readable storage medium.

* * * * *